US012008920B2

(12) United States Patent
Santos-Sheehan et al.

(10) Patent No.: US 12,008,920 B2
(45) Date of Patent: Jun. 11, 2024

(54) SYSTEMS AND METHODS FOR CUSTOMIZING PLAYBACK OF DIGITAL TUTORIALS

(71) Applicant: Rovi Guides, Inc., San Jose, CA (US)

(72) Inventors: Nathalia S. Santos-Sheehan, Royersford, PA (US); Christopher Franklin, Drexel Hill, PA (US); Jennifer L. Holloway, Wallingford, PA (US); Daniel P. Rowan, Springfield, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/875,784

(22) Filed: Jul. 28, 2022

(65) Prior Publication Data

US 2022/0366805 A1    Nov. 17, 2022

Related U.S. Application Data

(62) Division of application No. 16/225,040, filed on Dec. 19, 2018, now Pat. No. 11,423,794.

(51) Int. Cl.
    *G09B 5/06*        (2006.01)
(52) U.S. Cl.
    CPC .................... *G09B 5/065* (2013.01)
(58) Field of Classification Search
    CPC .......... G09B 5/06; G11B 27/102; G10L 15/22
    See application file for complete search history.

(56) References Cited

U.S. PATENT DOCUMENTS

| 7,761,892 B2 | 7/2010 | Ellis et al. |
| 8,990,274 B1* | 3/2015 | Hwang ..................... G06F 3/00 |
| | | 708/133 |
| 2013/0036353 A1 | 2/2013 | Zavesky et al. |
| 2014/0278391 A1* | 9/2014 | Braho ..................... G10L 25/78 |
| | | 704/233 |
| 2018/0268865 A1 | 9/2018 | Ekambaram et al. |
| 2020/0193264 A1* | 6/2020 | Zavesky ................ G06N 20/00 |
| 2020/0202735 A1 | 6/2020 | Santos-Sheehan et al. |
| 2020/0202848 A1 | 6/2020 | Santos-Sheehan et al. |

OTHER PUBLICATIONS

PCT International Search Report for International Application No. PCT/US2019/065473, dated Jul. 21, 2020 (21 pages).
Amir, et al., Using Audio Time Scale Modification for Video Browsing, Proceedings of the 33rd Hawaii International on Systems Sciences, Jul. 22, 2000 (10 pages).

(Continued)

*Primary Examiner* — Omkar A Deodhar
(74) *Attorney, Agent, or Firm* — HALEY GUILIANO LLP

(57) ABSTRACT

Systems and methods are disclosed herein for continuing playback of a digital tutorial until a user interrupts the playback by signaling to the system that there is an issue or that the user needs help. The system, through detecting a recording that the user captured or a person's utterance (e.g., through passive voice monitoring) determines that the user's needs assistance with the digital tutorial. The system determines, based on the recording, that the user needs help to get to a specific step and play supplemental instructions to the user to get to the specific step.

6 Claims, 10 Drawing Sheets

(56) References Cited

OTHER PUBLICATIONS

Brako, et al., "Loop Process Book MHCI+D Capstone, Summer 2015 Table Contents Introduction," Jan. 2, 2017 (48 pages).
Chang, et al., "How to Design Voice Based Navigation for How-To-Videos," Human Factors in Computing Systems, May 2, 2019 (11 pages).
Kim, et al., "Data-driven interaction techniques for improving navigation of educational videos," User Interface Software and Technology, Oct. 5-8, 2014 (10 pages).
Yadav, et al., "Content-driven Multi-Modal Techniques for Non-linear Video Navigation," Intelligent User Interfaces, Mar. 29-Apr. 1, 2015 (12 pages).

* cited by examiner

SYSTEMS AND METHODS FOR CUSTOMIZING PLAYBACK OF DIGITAL TUTORIALS

CROSS-REFERENCE TO RELATED APPLICATION(S)

This application is a divisional of U.S. patent application Ser. No. 16/225,040, filed on Dec. 19, 2018, the disclosure of which is incorporated by reference herein in its entirety.

BACKGROUND

The present disclosure is directed to customizing playback of digital tutorials based on user interactions with the digital tutorials.

SUMMARY

Tutorials for completing various tasks are used by people daily. From assembling furniture to preparing food items, tutorials are vital for the success of many products. In recent years, digital tutorials have started to appear on digital devices such as computers, electronic tablets, and other similar devices. Those conventional digital tutorials were simple videos that lacked a way to track user progress or to determine whether the user was successfully following the digital tutorial. One approach used by conventional systems to solve the problem of tracking user progress and determining whether the user is successfully following the digital tutorial requires a user to take an image of a result of every step of the digital tutorial. The image is then used, by the system, to determine whether that specific step of the tutorial has been properly completed, and if the step has not been properly completed, that step is replayed. This approach creates a number of problems. First, this approach leads to system resources being wasted to analyze images of every step of the process, even if those steps were properly completed. Second, this approach puts a burden on a user to take images even when not needed, wasting the user's time and leading to a negative user experience.

The embodiments disclosed herein solve these and other problems in conventional systems. The disclosed system continues playback of a tutorial until a user interrupts the playback by signaling to the system that there is an issue or that the user needs help, thus preserving processing resources for when they are needed and improving user experience. In some embodiments, the system detects a person's utterance (e.g., through passive voice monitoring) and determines that the user's utterance is related to the digital tutorial. The system determines, based on the utterance, which step of the digital tutorial is problematic for the user, and replays the problematic step.

In other embodiments, the disclosed system supplements the digital tutorial with additional instructions, when requested by the user (e.g., through making a recording of the current task state). Thus, the disclosed system monitors for a user input regarding the progress of the digital tutorial, and acts (e.g., uses system resources) only when necessary. In some instances, the system may monitor for and detect voice input regarding the process of the task and use a recording the user has made to determine whether supplemental instructions are needed. For example, the system may detect the user saying: "Am I doing this right?" and proceed with generating a recording of the state of the given task. In some instances, the system may detect that a user made a recording of the current progress of the task and trigger a determination (without user input) of whether supplemental instructions are needed to bring the current progress up to the point where it should be. The system analyzes the recording (e.g., an image) to identify supplemental instructions/actions that are needed to bring the current progress up to the point where it should be. When the system identifies the proper instructions/actions, the system delivers those instructions/actions to the user.

A tutorial application (e.g., active on a computing device such as an electronic tablet, personal computer, smartphone, or another suitable device) may execute any actions described herein. However, it should be noted that these actions may be executed by a different application active outside the tutorial itself, and the term "tutorial application" is used for clarity of the description.

The tutorial application may play a digital tutorial that includes multiple steps for completing a task. For example, the tutorial application may play a digital tutorial to put together a piece of furniture (e.g., an office chair) and detect a user utterance. The tutorial application can detect that the utterance refers to the digital tutorial that is being played or was just played. For example, the tutorial application may detect the user saying: "What's wrong with the seat adjustment?" When the tutorial application detects the utterance, the tutorial application extracts acoustic data from the utterance. The acoustic data can include any of amplitude, rhythm, pitch, timbre, duration, volume, direction, and words.

Once the acoustic data is extracted, the tutorial application may use the acoustic data (e.g., words extracted from the acoustic data) to identify a step of the digital tutorial related to the utterance. It should be noted that extraction and step-identifying steps may be done in parallel. To continue with the example above, if the tutorial application detects that the user said, "What's wrong with the seat adjustment," the tutorial application uses the words to search metadata of the digital tutorial for a matching step (e.g., seat adjustment step).

Sometimes, metadata of multiple steps of the digital tutorial will match the user's words. In these instances, the tutorial application performs the following actions to identify the correct step. The tutorial application retrieves a priority for each of the matching words and generates a priority value for each step of the digital tutorial. The tutorial application identifies the matching step based on its priority value. For example, if one step has keywords with higher priorities than a second step, the tutorial application selects the first step as the step to be replayed.

In addition to identifying the step to replay, the tutorial application can use the received utterance to determine whether the utterance indicates that the replay should be performed. Specifically, the tutorial application determines whether the acoustic data matches an electronically stored replay trigger. Electronically stored replay triggers may be stored in various forms, and matches may be determined with different processes. Each electronically stored replay trigger may be an acoustic pattern that, if matched, indicates a step of the tutorial to be replayed. Each acoustic pattern may include values corresponding to one or more of amplitude, rhythm, pitch, timbre, duration, volume, direction, and other suitable acoustic characteristics. The tutorial application compares each of these acoustic patterns with the acoustic data of the utterance. If an acoustic pattern matches the acoustic data, the tutorial application replays the matched step. If no acoustic pattern matches the acoustic data, the tutorial application does not replay the matched step.

In some embodiments, the tutorial application stores replay triggers (i.e., acoustic patterns) as part of a neural network. For example, the tutorial application may be used to train the neural network to classify acoustic data as matching a replay trigger or not matching a replay trigger. For the classification to function, the neural network must be trained with training data. The tutorial application can feed acoustic patterns that are known replay triggers into the neural network so that matching patterns, in acoustic data, can be recognized. When the neural network is trained, the tutorial application can use the neural network to determine whether acoustic data matches a replay trigger.

To use the neural network, the tutorial application determines what features (e.g., acoustic characteristics) the neural network can receive as input. For example, a neural network may take as input any combination of amplitude, rhythm, pitch, timbre, duration, volume, direction, or another suitable characteristic. The tutorial application extracts, from the acoustic data, any of the features supported by the neural network, and runs the data through the neural network to determine whether the extracted characteristics match a replay trigger. If there is a match, the tutorial application replays the identified step.

When the tutorial application has replayed the identified step, the tutorial application may enable the user to check whether the step was successfully completed. For example, the tutorial application may request that the user capture a recording (e.g., an image, an audio recording, a video recording or an audio-visual recording) of a current progress point of the task, and determine, using the recording, whether it matches a progress point for the step indicated in the utterance. If the current progress point of the task matches the progress point for the step of the tutorial indicated by the utterance, the tutorial application plays the next step. If the current progress point of the task does not match the progress point for the step, the tutorial application searches (e.g., in a database) for an entry that matches the recording and identifies instructions/actions needed to bring the current progress point in line with the progress point for the step of the digital tutorial.

The tutorial application may also be configured to modify a digital tutorial in response to detecting that a step of the digital tutorial has not been completed or has not been completed properly. When a specific step of the digital tutorial finishes playing, the tutorial application can detect whether the user has taken a recording of the current state of the task and determine, based on the recording, whether the task is at the proper progress point as compared with the progress of the digital tutorial. For example, if the digital tutorial is geared toward preparing a food item, the tutorial application may access an image of the item being cooked (e.g., on a stove) and determine whether the mixture appears to be of the right consistency, color, etc. In another example, if the task involves tuning an instrument (e.g., a piano), the tutorial application may access an audio recording of a specific key to ascertain whether the given key has been tuned properly. If the tutorial application determines that the progress points do not match, the tutorial application plays instructions for matching the current progress point of the tutorial.

In some embodiments, the tutorial application uses a neural network to determine whether the current progress point of the task matches the progress point of the given step. It should be noted that prior to using the neural network for the determination, the neural network must be trained, using training data, to recognize matches for different steps of the digital tutorial. For example, each step of the digital tutorial can have multiple images showing what a proper result should look like. Those images can be run through the neural network to establish the proper patterns for determining whether a given image matches a given step. A similar process may be performed for audio and audio-visual recordings. To determine whether a recording matches a proper result of the step, the tutorial application determines a plurality of features that a neural network can receive as input, extracts the appropriate features from a recording showing the current progress point, and executes the neural network using those features as input to the neural network.

Instead of using a neural network, the tutorial application can use a comparison algorithm to determine whether a recording of the current progress point matches a recording for a given step. To perform the comparison, the tutorial application accesses a database that stores recordings and corresponding steps and retrieves a set of recordings proper for the given step and of the same type as the captured recording (e.g., an image). The tutorial application compares the retrieved recordings with the captured recording to determine whether there is a match.

The tutorial application can also be configured to modify the tutorial when a user asks for help. If the tutorial application detects an utterance asking for help (e.g., "Am I doing this right?" the tutorial application accesses a captured image of the task to determine progress of the user. For example, the tutorial application may prompt the user to take an image of the current progress point of the task and, based on the progress point shown in the picture, identify and present instructions to the user for bringing the current state of the task to the current progress point of the tutorial. The instructions may include a video of what the user needs to do to bring the current state of the task to the current progress point of the tutorial. For example, if the user is building a piece of furniture, the video can show the user how to fix a step that the user did not properly complete. In another example, if the user is preparing a meal, the tutorial application can instruct the user to keep boiling the mixture for a specific amount of time before proceeding to the next step.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
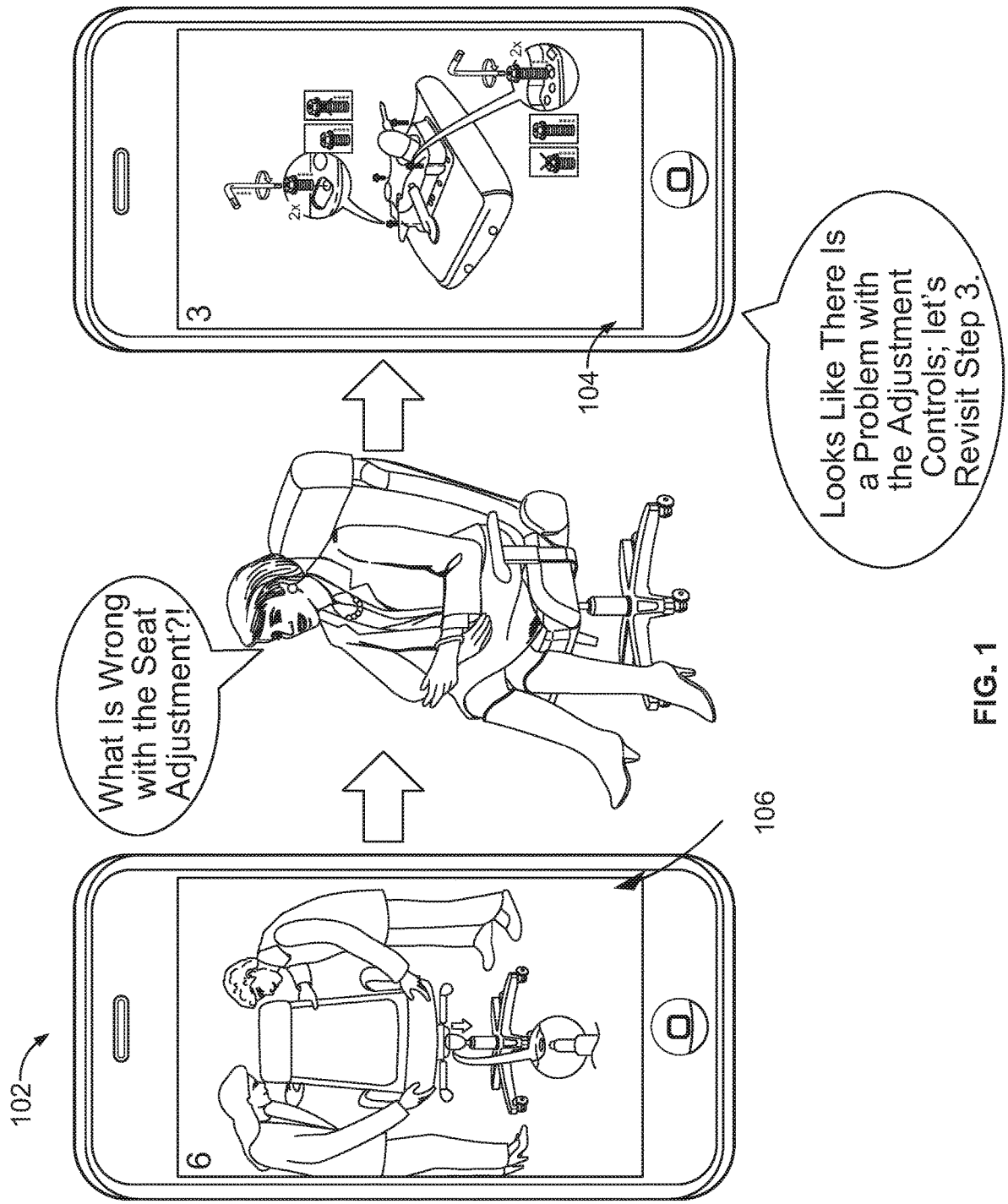
FIG. 1 shows an illustrative view for replaying a step of a digital tutorial based on an utterance from a user, in accordance with some embodiments of the disclosure.

Systems and methods are disclosed herein for modifying presentation of digital tutorials. FIG. 1 shows an illustrative view for replaying a step of a digital tutorial based on an utterance of a user. Electronic device 102 illustrates playback of a digital tutorial. The digital tutorial illustrated in FIG. 1 instructs a user how to put together an office chair. Screen 106 shows step 6 of the digital tutorial. While the digital tutorial is playing or immediately after, the user tests the result of following the digital tutorial and realizes that the seat adjustment controls are not working correctly. Thus, the user says, "what is wrong with the seat adjustment?" The tutorial application is configured to monitor for passive voice input and detects the user's utterance. As discussed above, the tutorial application analyzes the utterance and determines (e.g., based on the words of the utterance and other acoustic data) that the office chair has not been properly build and that one of the steps needs to be replayed. The tutorial application also compares the words of the utterance with keywords associated with each step of the tutorial. Based on the comparison, the tutorial application matches the utterance with keywords of a specific step and replays that step.

Figure 2:
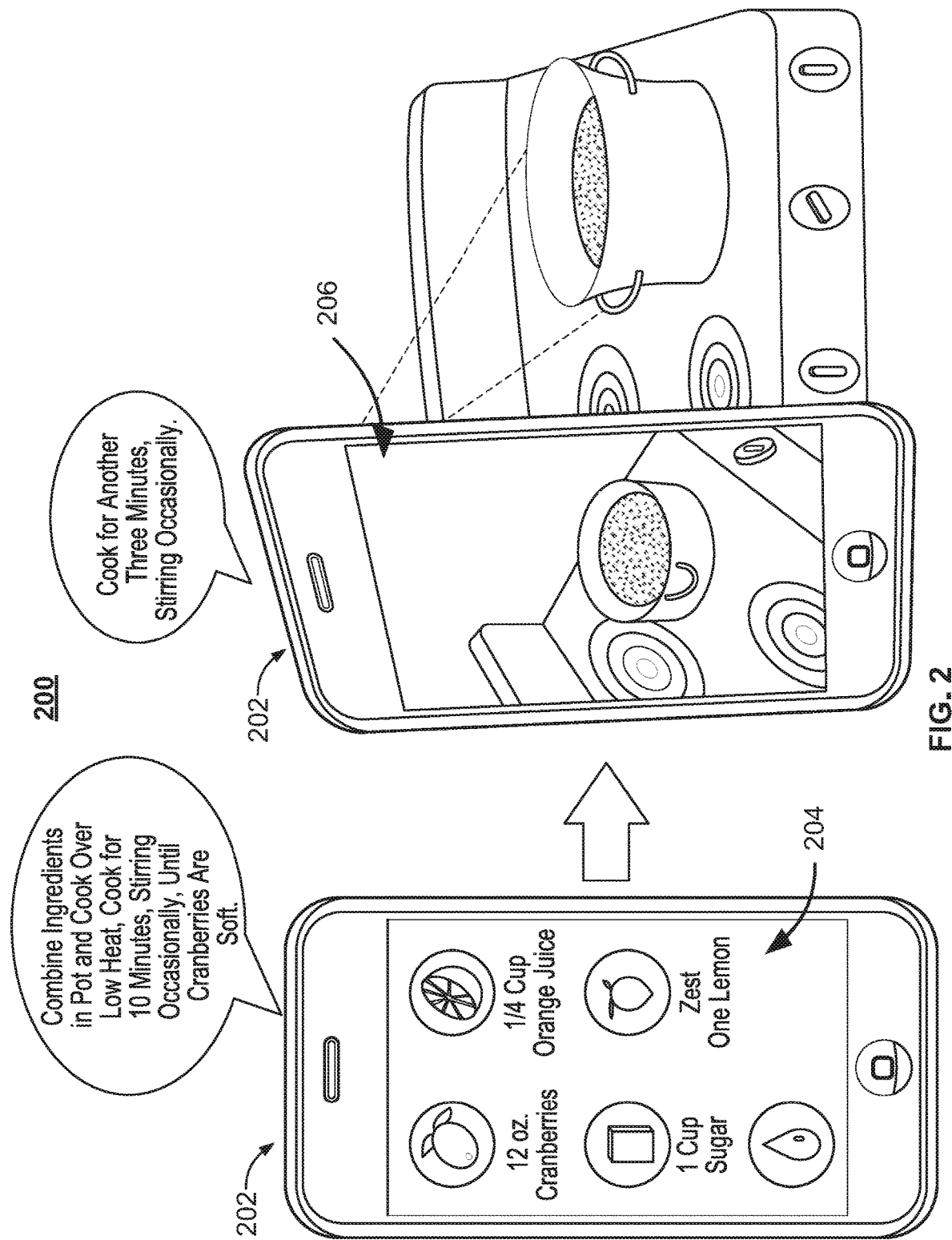
FIG. 2 shows an illustrative view for determining whether a digital tutorial is being properly followed by a user, in accordance with some embodiments of the disclosure.

FIG. 2 shows an illustrative view for determining whether a digital tutorial is being properly followed. Device 202 that displays screen 204 that shows a list of ingredients for cooking cranberry sauce. In addition, device 202 may include a speaker and the speaker can output audio instructions on what to do with the ingredients shown. When the user completes the instructed step of the tutorial and puts the mixture on the stove, the user may not know when to stop cooking. Thus, the user may capture, using device 202, image 206 (displayed on device 202) of the mixture as it is being cooked. The tutorial application may determine that the image is of the mixture and analyze the image. For example, the tutorial application may transmit the image to a remote server for analysis. Based on the results of the analysis the tutorial application may identify instructions for the user so that the user can successfully match the current state of the task to the current place of the digital tutorial. For example, device 202 may determine, based on the image, that the mixture needs to be cooked for another three minutes while being stirred. Based on that determination, device 202 may output to the user the instruction to cook the mixture for three minutes while stirring. The output may be audio, video, or a combination of the two. For example, device 202 may output a video of the instruction (i.e., how to properly stir the mixture) together with audio instructions to cook and stir for another three minutes.

Figure 3:
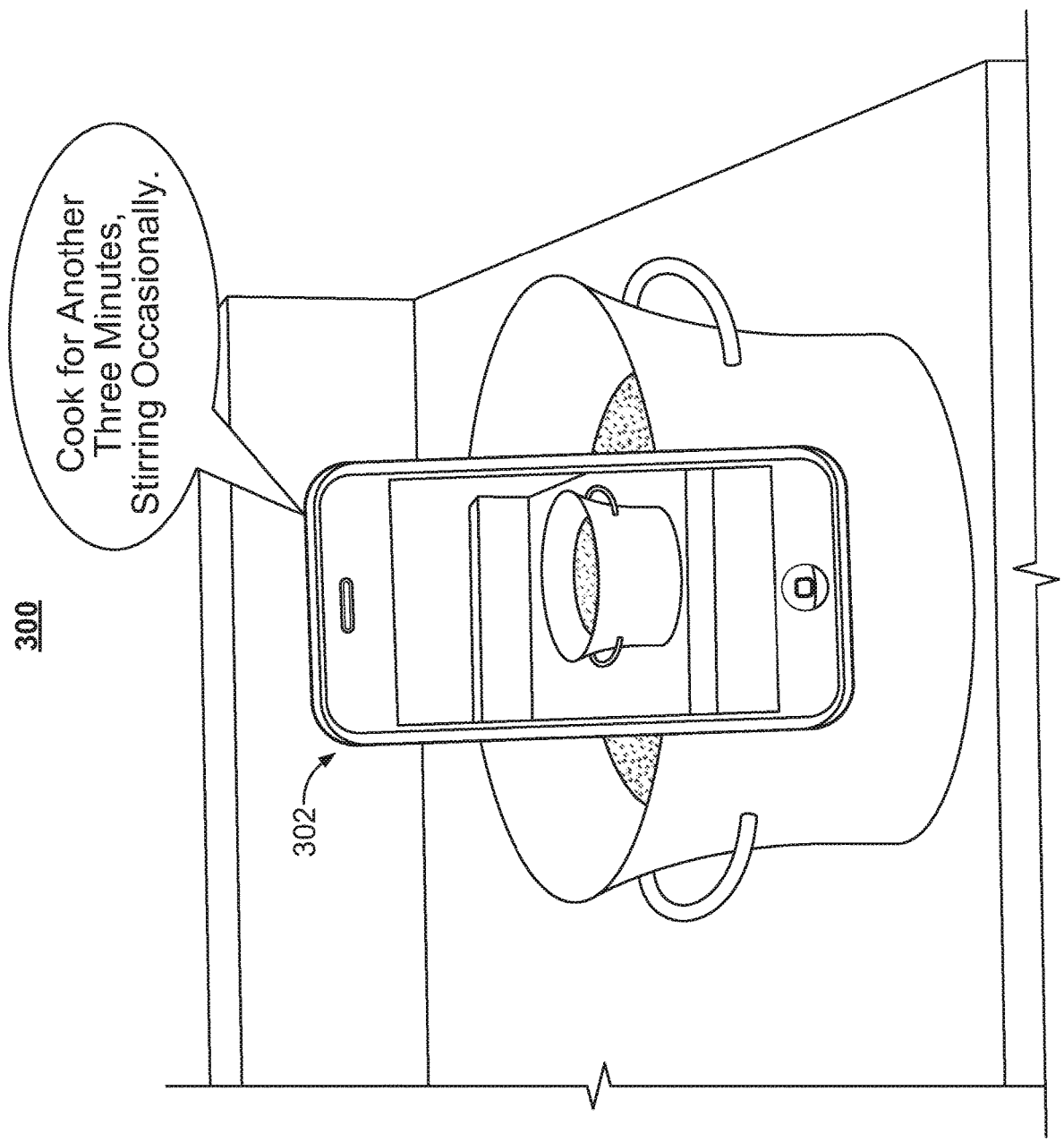
FIG. 3 shows an illustrative view for determining whether the user needs instructions to bring a task in line with a given step of a digital tutorial, in accordance with some embodiments of the disclosure.

FIG. 3 shows an illustrative view for determining whether the user needs instructions to bring a task in line with a given step of a digital tutorial. For example, as the user is preparing cranberry sauce, the user may be confused as to whether the user is following the steps of the tutorial correctly. The user may say, "Am I doing this right?" The tutorial application may be monitoring for passive voice input and identify the user's question. In response to the question, the tutorial application may prompt the user to capture an image of the current state of the task. The tutorial application may analyze the image and identify instructions for matching the state of the task with a current progress point of the digital tutorial. Upon identifying the required instructions, the tutorial application delivers those instructions to the user.

Figure 4:
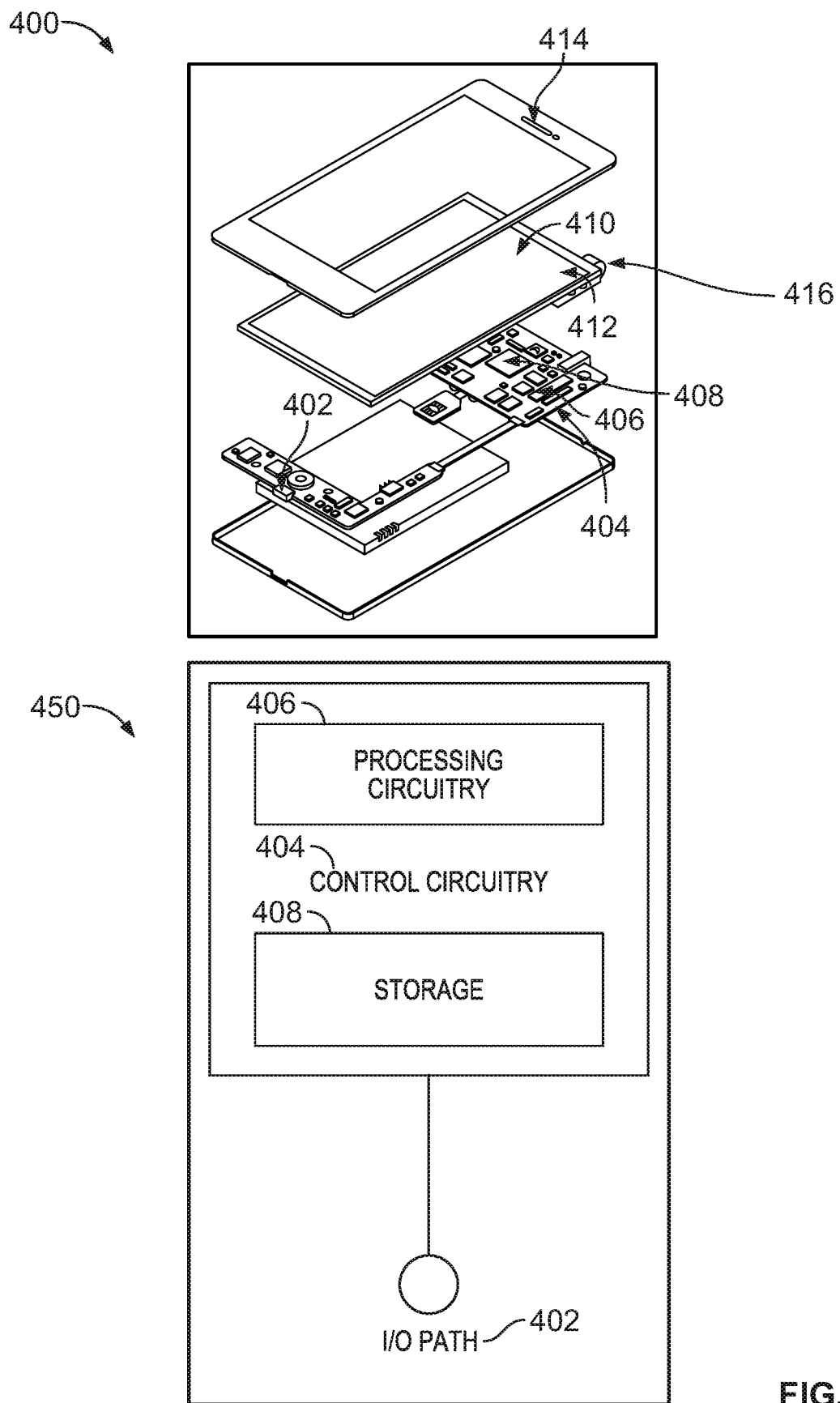
FIG. 4 is a diagram of two illustrative computing devices, in accordance with some embodiments of the disclosure.

FIG. 4 is a diagram of two illustrative computing devices, in accordance with some embodiments of this disclosure. As depicted, media device 400 may be a smartphone or an electronic tablet, whereas media device 450 may be a server. Devices 400 and 450 may receive content and data via input/output (hereinafter "I/O") path 402. I/O path 402 on device 400 may provide visual data (e.g., images that are being sent from device 450) and other data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. On device 450, I/O path 402 may be used to transmit data (e.g., image data) to device 400 and also receive commands from other devices (e.g., device 400).

Control circuitry 404, whether on device 400 or device 450, may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a notification delivery application stored in memory (e.g., storage 408). Specifically, control circuitry 404 may be instructed by the notification delivery application to perform the functions discussed above and below.

In client/server-based embodiments, control circuitry 404 may include communications circuitry suitable for communicating with a notification delivery application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 408 or instead of storage 408.

Control circuitry 404 may include audio-generating circuitry, one or more MP3 decoders or other digital decoding circuitry, or any other suitable video or audio circuits or combinations of such circuits. Encoding circuitry (e.g., for converting digital signals to audio and video signals for storage and presentation) may also be provided. Control circuitry 404 may also include scaler circuitry for upconverting and downconverting content into the preferred output format of the device 400. Circuitry 404 may also include digital-to-analog converter circuitry and analog-to-digital converter circuitry for converting between digital and analog signals. The encoding circuitry may be used by the media device to receive and to display, to play, or to record/store content. The circuitry described herein, including, for example, the encoding, decoding, encrypting, decrypting, scaler, and analog/digital circuitry, may be implemented using software running on one or more general purpose or specialized processors. If storage 408 is provided as a separate device from device 400, the encoding circuitry may be associated with storage 408.

A user may send instructions to control circuitry 404 using user input interface 410 of media device 400. User input interface 410 is illustrated as a touchscreen, but may be any suitable user interface, such as a remote control, mouse, trackball, keypad, keyboard, touchscreen, touchpad, stylus input, joystick, voice recognition interface, or other user input interfaces. Display 412 may be a touchscreen or touch-sensitive display. In such circumstances, user input interface 410 may be integrated with or combined with display 412. Speakers 414 and camera 416 may be provided as integrated with other elements of media device 400. Device 450 may also have control circuitry 404 that includes processing circuitry 406, storage 408, and I/O path 402. These components can function in the same manner as described in relation to device 400. Device 400 may also include a microphone (not pictured). The microphone may be activated by different applications for active and passive input. It should be noted that the microphone may be part of a user input interface.

Figure 5:
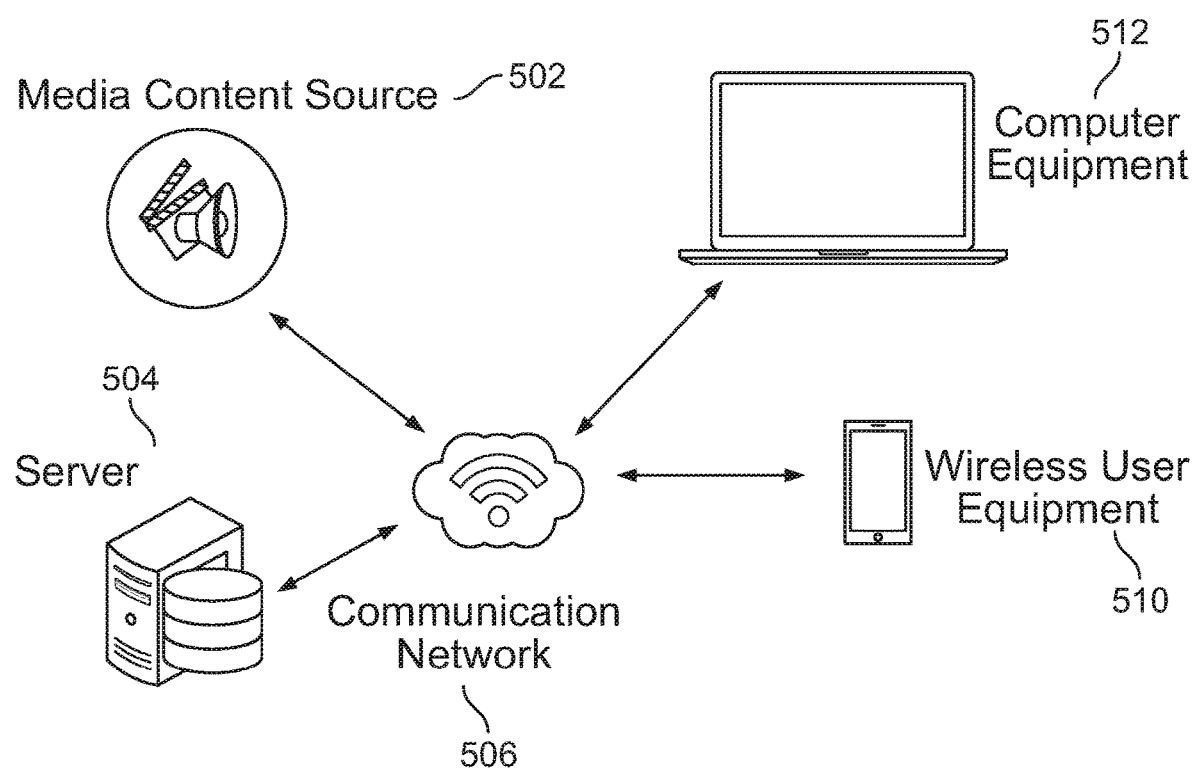
FIG. 5 is a diagram of an illustrative media system, in accordance with some embodiments of the disclosure.

Devices 400 and 450 can be part of system 500 of FIG. 5. Device 400 may be computer equipment 512, wireless equipment 510, or any other type of user equipment suitable for accessing content, such as a non-portable gaming machine. For simplicity, these devices may be referred to herein collectively as client devices and may be substantially similar to devices described above. Device 450 may be represented by server 504. In system 500, there is typically more than one of each type of client device, but only one of each is shown in FIG. 5 to avoid overcomplicating the drawing. In addition, each user may utilize more than one type of client device and also more than one of each type of client device.

The user equipment devices may be coupled to communication network 506. Communication network 506 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, Inc. The user equipment devices may also communicate with each other directly through an indirect path via communication network 506.

System 500 includes media content source 502 and processing server 504. Communications with the media content source 502 and processing server 504 may be exchanged over one or more communications paths but are shown as a single path in FIG. 5 to avoid overcomplicating the drawing. In addition, there may be more than one of each of media content source 502 and processing server 504, but only one of each is shown in FIG. 5 to avoid overcomplicating the drawing. If desired, media content source 502 and processing server 504 may be integrated as one source device.

Processing server 504 may retrieve guidance data from media content source 502, process the data as will be described in detail below, and forward the data to the client devices 508, 510, 512. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 502 may include cable sources, satellite providers, on-demand providers, Internet providers, over-the-top content providers, or other providers of content. Media content source 502 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 502 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Figure 6:
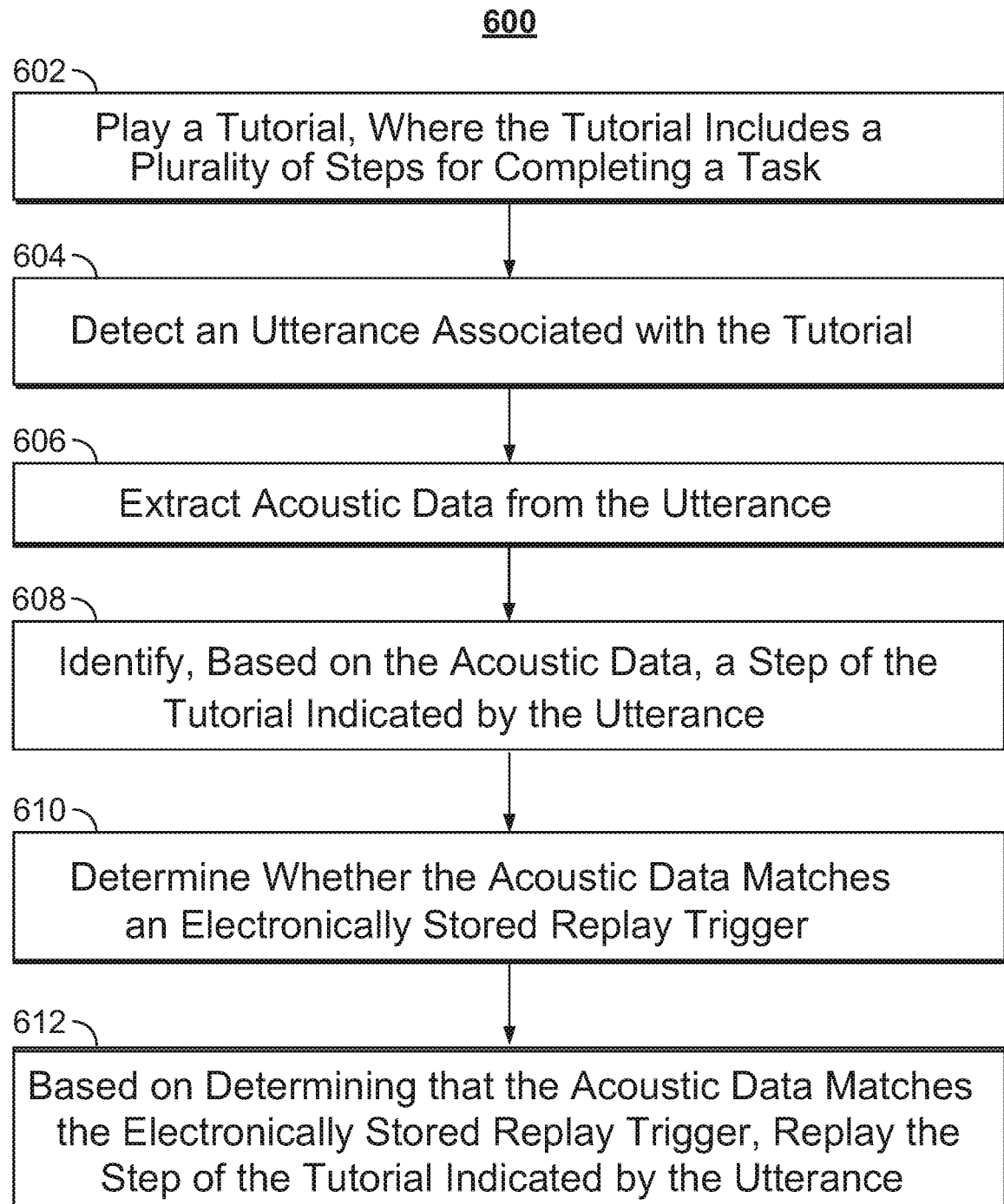
FIG. 6 is a flowchart of an illustrative process for replaying a part of a digital tutorial responsive to voice input, in accordance with some embodiments of the disclosure.

The systems and devices described in FIGS. 4 and 5 enable not only display of the screens of FIGS. 1-3, but also the execution of processes described in FIGS. 6-10. FIG. 6 is a flowchart of an illustrative process for replaying a part of a digital tutorial responsive to voice input. At 602, control circuitry 404 plays a digital tutorial, where the tutorial includes a plurality of steps for completing a task. The control circuitry may retrieve the tutorial from storage 408 or from a remote server (e.g., server 504 or media content source 502 over communication network 506). The control circuitry may play the digital tutorial through speaker 414 in combination with display 412.

At 604, control circuitry 404 detects an utterance associated with the digital tutorial. For example, device 102 can be equipped with a microphone. When the tutorial begins, the control circuitry can be configured to start monitoring for passive (and active) voice input. When the control circuitry detects any kind of audio (e.g., using the microphone) the control circuitry can analyze the audio to determine whether the audio is human speech. If the control circuitry determines that the audio is human speech, the control circuitry extracts the words from the voice signal. When the words are detected, the control circuitry can compare the words with a set of words that are associated with the digital tutorial. For example, the control circuitry can query a database (e.g., using an identification of the digital tutorial being played or just played) and retrieve keywords associated with the tutorial. The control circuitry can compare the extracted words with words of the utterance to determine a match. If there is a match, control circuitry 404 determines that the utterance is associated with the digital tutorial.

At 606, control circuitry 404 extracts acoustic data from the utterance. For example, the acoustic data may include amplitude, rhythm, pitch, timbre, duration, volume, direction, and words. The extraction algorithm can store the extracted data in storage 408. In some embodiments, the control circuitry may transmit the utterance to remote server (e.g., server 504 or media content source 502) for data extraction and receive back a data structure that includes all the extracted information.

At 608, control circuitry 404 identifies, based on the acoustic data, a step of the tutorial indicated by the utterance. The control circuitry may make an identification by comparing keywords. Specifically, the control circuitry may compare a plurality of keywords within the acoustic data with keywords associated with each of the plurality of steps for completing the task, and identify, based on comparing the plurality of keywords within the acoustic data with keywords associated with each of the plurality of steps for completing the task, the step of the tutorial indicated by the utterance.

Figure 9:
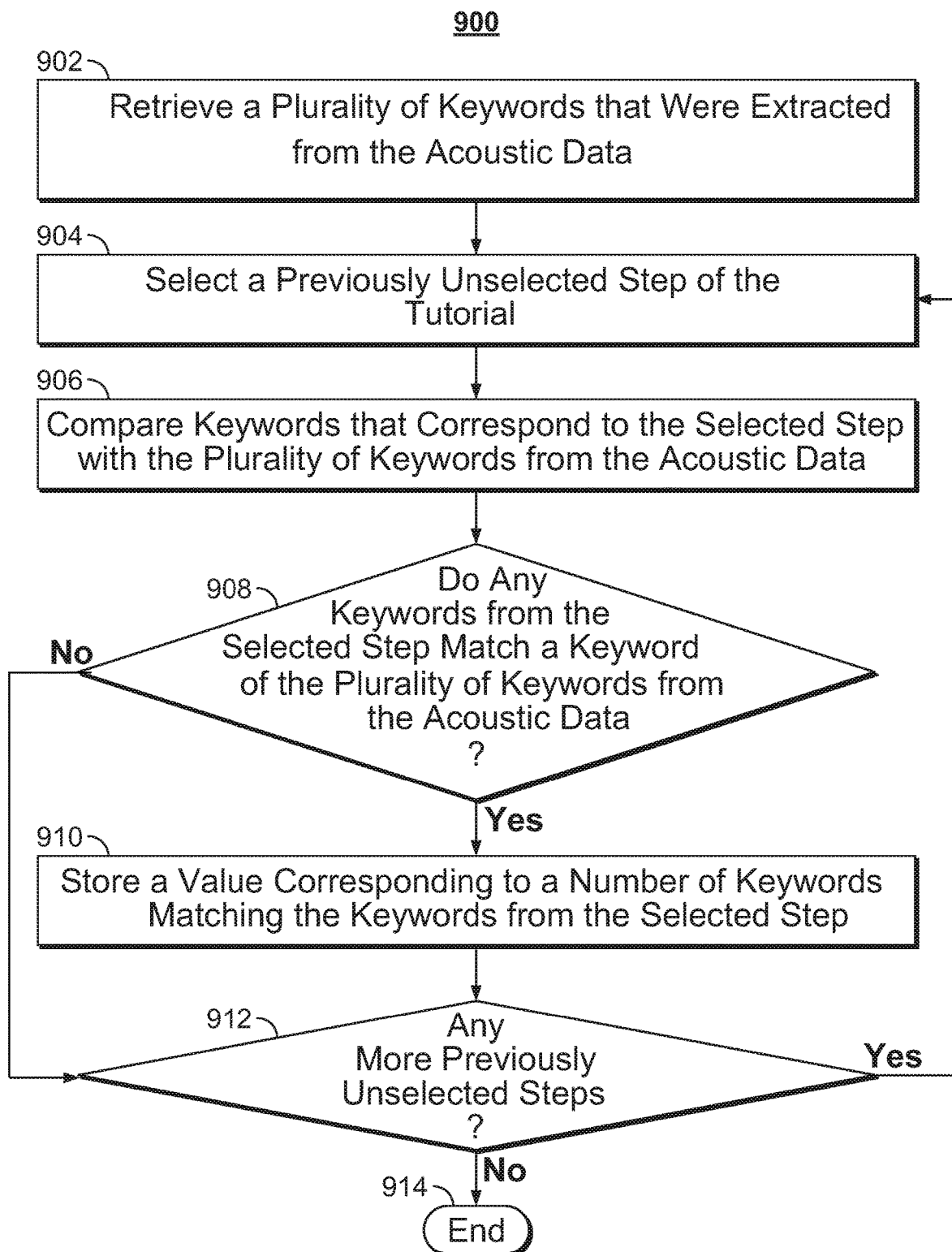
FIG. 9 is a flowchart of an illustrative process for determining which keywords from the acoustic data match keywords associated with a given step, in accordance with some embodiments of the disclosure.

FIG. 9 is a flowchart of an illustrative process for determining which keywords from the acoustic data match keywords associated with a given step. At 902, control circuitry 404 retrieves a plurality of keywords that were extracted from the acoustic data. For example, the keywords may have been stored in storage 408 (e.g., random access memory, hard disk, or another suitable memory).

At 904, control circuitry 404 selects a previously unselected step of the tutorial. For example, each step of the digital tutorial may have associated keywords. Those keywords may be stored as metadata associated with the corresponding step. The control circuitry may be configured to retrieve the keywords associated with the selected step, to determine whether the step matches the keywords in the acoustic data.

At 906, control circuitry 404 compares keywords that correspond to the selected step with the plurality of keywords from the acoustic data. For example, the control circuitry may execute a loop that selects each keyword of the acoustic data and execute a string comparison function with the keywords of the step. The control circuitry may also maintain a counter of how many keywords associated with the selected step match the keywords of the utterance. At every iteration of the loop, if a keyword is matched, the control circuitry may increment the counter.

At 908, control circuitry 404 determines whether there are keywords from the selected step that match a keyword of the plurality of keywords from the acoustic data. For example, the control circuitry may determine whether the counter described above is greater than zero. If there are keywords from the selected step that match a keyword of the plurality of keywords from the acoustic data, process 900 moves to 910. At 910, control circuitry 404 stores a value corresponding to a number of keywords matching the keywords from the selected step. For example, the control circuitry may store a counter associated with the selected step. If there are no matched keywords, process 900 moves to 912.

At 912, control circuitry 404 determines whether there are any more previously unselected steps. If there are more previously unselected steps, process 900 moves to 904, where another previously unselected step of the digital tutorial is selected. If there are no more previously unselected steps, process 912 moves to 914 and ends. At this point, the control circuitry may identify the matching step, for example, the step that is associated with the highest value counter.

The control circuitry may match multiple keywords for multiple steps. That is, keywords of multiple steps may equally match the keywords of the utterance. In these embodiments the control circuitry performs the following actions. The control circuitry compares (as described above) a plurality of keywords within the acoustic data with keywords associated with each of the plurality of steps for completing the task. The control circuitry identifies, as a result of the comparison, two or more sets of keywords, where each of the two more matching sets of keywords corresponds to a matching step of the plurality of steps of the tutorial. Thus, the control circuitry has identified multiple matching steps. To select the correct step, the control circuitry retrieves for each of the two or more sets of keywords a plurality of priorities, where each priority of the plurality of priorities is associated with a given keyword. From that information the control circuitry calculates a priority value for each set and selects the step corresponding to a set of keywords with a highest priority value.

To continue with FIG. 6, at 610, control circuitry 404 determines whether the acoustic data matches an electronically stored replay trigger. The control circuitry may use various methods to make the determination. For example, each electronically stored replay trigger may be an acoustic pattern that indicates that a step of the digital tutorial should be replayed. Each acoustic pattern may include one or more of a value for amplitude, a value for rhythm, a value for pitch, a value for timbre, a value for duration, a value for volume, a value for direction, and one or more words. The control circuitry accesses a plurality of characteristics from the acoustic data (i.e., sound and voice characteristics), and compares each of the plurality of characteristics from the acoustic data with a corresponding characteristic within each of the plurality of acoustic patterns. If a threshold number of characteristics match, control circuitry 404 determines that the acoustic data matches an electronically stored replay trigger. The control circuitry may, additionally or alternatively, compare the words of the acoustic data with words of an acoustic pattern. If a threshold number of words match, that information may be considered or used instead of the characteristics when determining whether acoustic data matches an electronically stored replay trigger.

Figure 8:
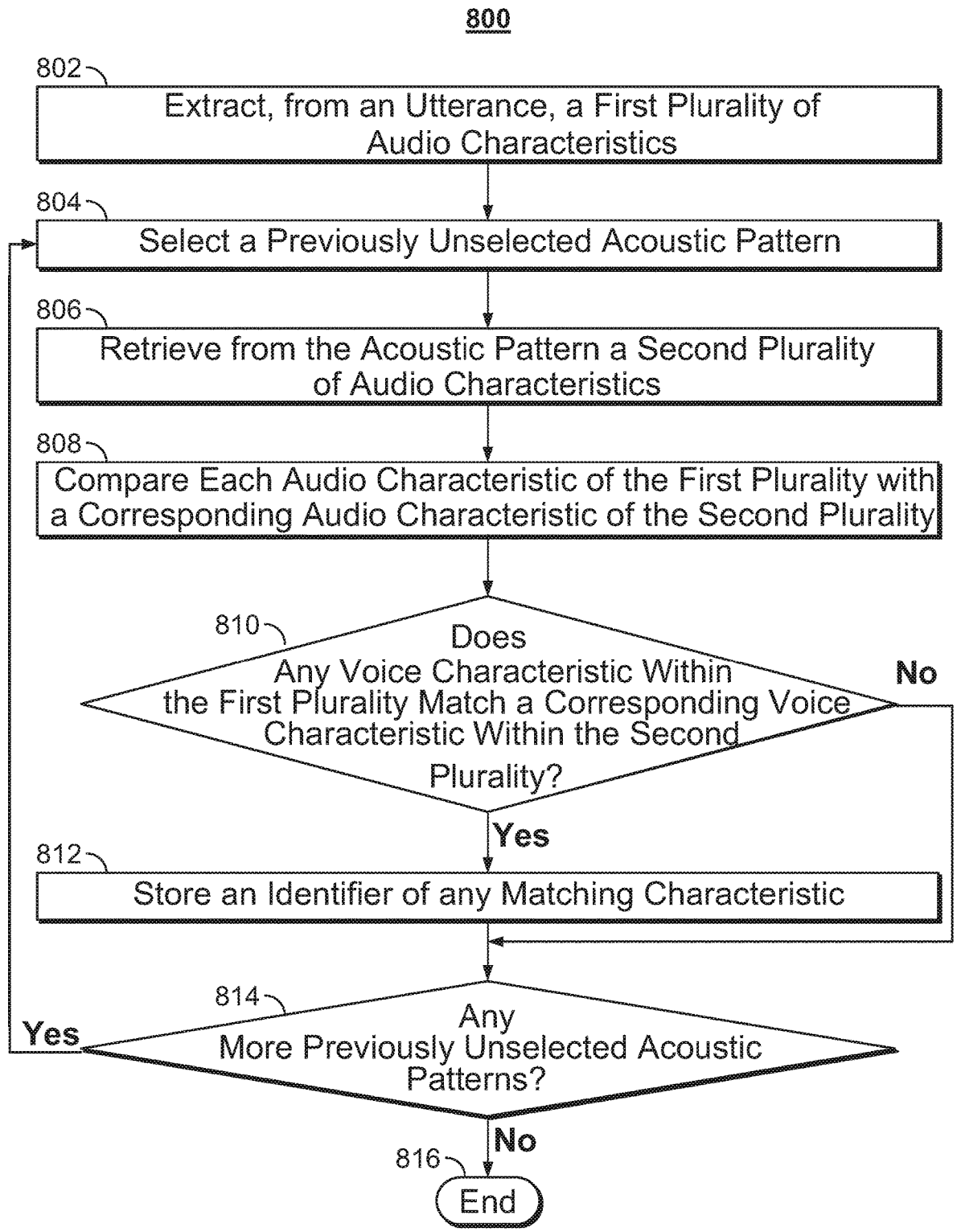
FIG. 8 is a flowchart of an illustrative process for identifying audio characteristics of an utterance that match an acoustic pattern, in accordance with some embodiments of the disclosure.

FIG. 8 is a flowchart of an illustrative process for identifying audio characteristics of an utterance that match an acoustic pattern. At 802, control circuitry 404 extracts, from the utterance, a first plurality of audio characteristics. For example, the control circuitry may use a feature extraction algorithm to extract amplitude, rhythm, pitch, timber, duration, volume, direction, words, and other suitable features. The extracted data may be stored in storage 408 or a remote server (e.g., server 504).

At 804, control circuitry 404 selects a previously unselected acoustic pattern. For example, the plurality of acoustic patterns may be stored in a data structure (e.g., a multi-dimensional array). Each audio characteristic may correspond to a dimension of the array so that the control circuitry can iterate through every acoustic pattern for characteristic comparison.

At 806, control circuitry 404 retrieves from the acoustic pattern a second plurality of audio characteristics. For example, the control circuitry may retrieve from the multi-dimensional array each characteristic stored for the selected acoustic pattern. The acoustic patterns may be stored in storage 408 (e.g., in a database), at a remote server (e.g., in a database on server 504), or at another suitable location.

At 808, control circuitry 404 compares each audio characteristic of the first plurality with a corresponding audio characteristic of the second plurality. For example, the control circuitry may compare corresponding fields (e.g., rhythm with rhythm, amplitude with amplitude, pitch with pitch, and other suitable fields). At 810, control circuitry 404 determines, based on the comparing, whether any voice characteristic within the first plurality match a corresponding voice characteristic within the second plurality. If a voice characteristic within the first plurality matches a corresponding characteristic within the second plurality, process 800 moves to 812. At 812, control circuitry 404 stores an identifier of any matching characteristic. For example, the control circuitry may store the identifier in storage 408 or at a remote location (e.g., server 504). If no voice characteristic within the first plurality matches a corresponding voice characteristic within the second plurality, process 800 moves to 814.

At 814, control circuitry 404 determines whether there are more previously unselected acoustic patterns. If there are more previously unselected acoustic patterns, process 800 moves to 804. If there are no more previously unselected acoustic patterns process 800 moves to 816 and ends. At this point, control circuitry 404 may retrieve the stored identifiers for matching characteristics and, based on the matching characteristics, identify an acoustic pattern that best matches the utterance.

Control circuitry 404 may use a neural network to determine whether acoustic data of an utterance matches an electronically stored replay trigger (e.g., an acoustic pattern). Specifically, control circuitry 404 accesses a neural network that is configured to determine whether acoustic data matches an acoustic pattern. For example, control circuitry 404 may transmit the acoustic data to a server (e.g., server 504), where the neural network resides. It should be noted that the neural network may reside in local storage 408.

When accessing the neural network, control circuitry 404 determines a plurality of features that a neural network can receive as input. Almost any neural network needs to be trained prior to being useful at making any sort of determination. Thus, the neural network can be trained by providing, to the neural network, a plurality of acoustic patterns that are known replay triggers, that is, any acoustic pattern that indicates that a step of the digital tutorial needs to be replayed. Each acoustic pattern can have several features. Those may include amplitude, rhythm, pitch, timber, duration, volume, direction, words, and other suitable features. Once the acoustic patterns have been used to train the neural network, the neural network can be used to determine whether a specific acoustic pattern corresponds to an electronically stored replay trigger. Thus, the control circuitry extracts one or more features from the acoustic data, where each of the one or more features corresponds to a feature that the neural network has been configured to process. The control circuitry then causes execution of the neural network using the one or more features extracted from the acoustic data.

Returning to FIG. 6, process 600 ends after action 612, where control circuitry 404, based on determining that the acoustic data matches the electronically stored replay trigger, replays the step of the tutorial indicated by the utterance. For example, the control circuitry may replay the seat adjustment step at device 102, as described in FIG. 1.

In some embodiments, for example, after the proper step has been replayed, the control circuitry may determine whether the digital tutorial is at a proper point. The control circuitry may prompt the user to make a recording of the current progress point of the task. Control circuitry 404 may determine, based on the recording, whether the current progress point of the task matches a progress point associated with the step of the tutorial indicated by the utterance. For example, as described with respect to FIG. 2, the control circuitry may analyze an image to determine whether the correct progress point has been reached. In response to determining that the current progress point of the task matches the progress point associated with the step of the tutorial indicated by the utterance, control circuitry 404 plays a next step of the digital tutorial. In response to determining that the current progress point of the task does not match the progress point associated with the step of the tutorial indicated by the utterance, control circuitry 404 accesses a record corresponding to the recording, retrieves from the record an action, and plays instructions to complete the action. For example, if the current progress point is not the correct progress point, control circuitry 404 can play instructions to the user to get to the proper progress point.

Figure 7:
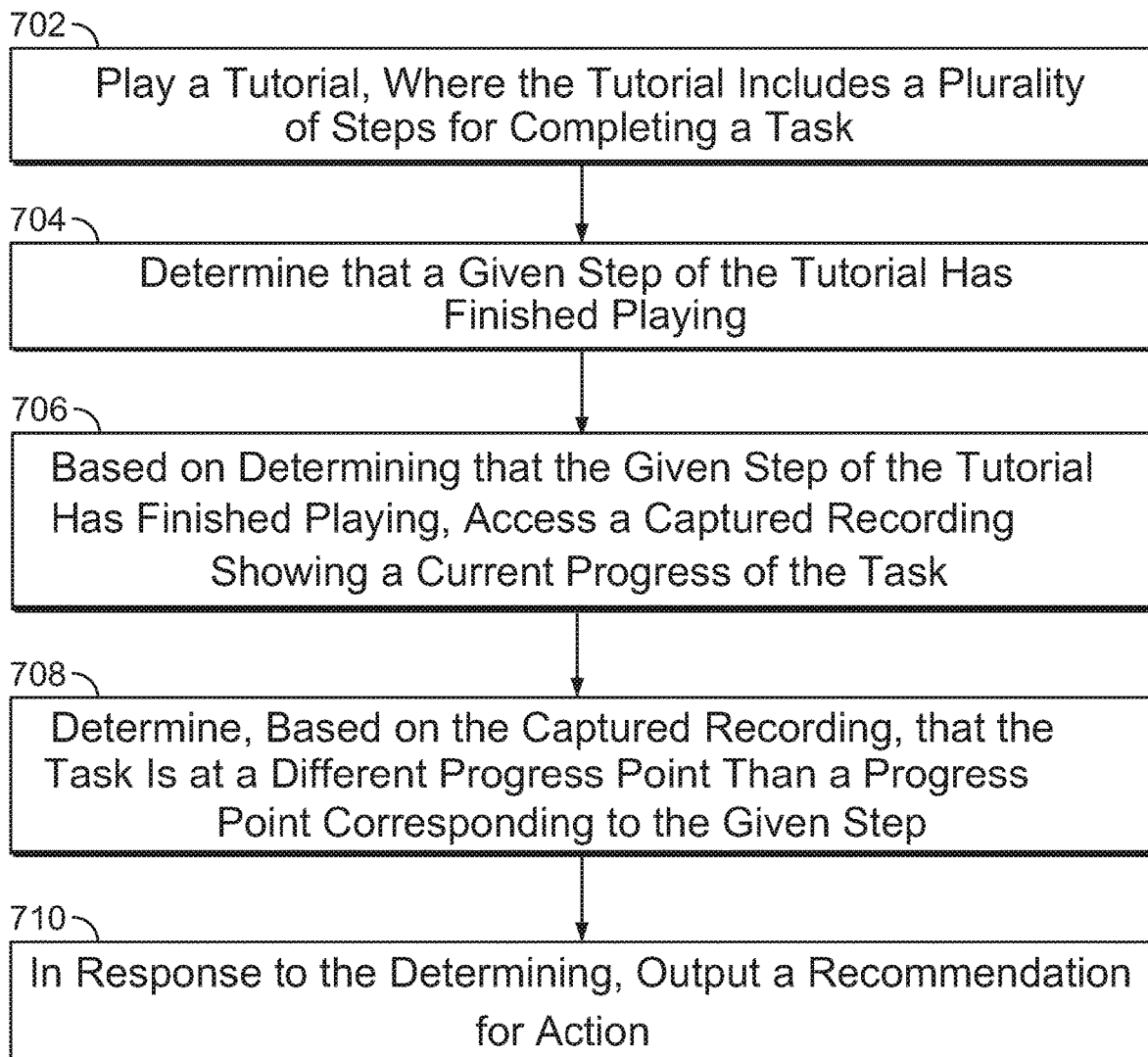
FIG. 7 is a flowchart of an illustrative process for modifying a digital tutorial in response to detecting that a step of the tutorial has not been properly completed, in accordance with some embodiments of the disclosure.

FIG. 7 is a flowchart of an illustrative process for modifying a digital tutorial in response to detecting that a step of the tutorial has not been properly completed. At 702, control circuitry 404 plays a digital tutorial that includes a plurality of steps for completing a task. The control circuitry may play the digital tutorial in the same manner as described with respect to FIGS. 1, 2, 3, and 6. At 704, control circuitry 404 determines that a given step of the tutorial has finished playing. The control circuitry may, upon finishing playback of the given step, move to action 706.

At 706, control circuitry 404, based on determining that the given step of the tutorial has finished playing, accesses a captured recording showing a current progress point. For example, as described above, a user may capture a recording of the current progress point, which may trigger the process to determine whether the user has so far been properly following the tutorial. As described with respect to FIGS. 2 and 3, the control circuitry may analyze an image (or an audio recording depending on the type of digital tutorial).

At 708, control circuitry 404 determines, based on the captured recording, that the task is at a different progress point than a progress point corresponding to the given step. The control circuitry may utilize one of several ways to make this determination. In some embodiments, the control circuitry compares a recording showing the task at the progress point corresponding to the given step with the recording of the current progress of the task. For example, if the tutorial is geared toward tuning a musical instrument, the control circuitry may execute a comparison of the audio of what the user has done with known audio recordings corresponding to the step at issue. The control circuitry may retrieve the known audio recording from storage 408 or from a remote server (e.g., server 504) over the communication network 506. Control circuitry 404 determines, based on comparing the recording showing the task at the progress point corresponding to the given step with the recording of the current progress of the task, that the recording showing the task at the progress point corresponding to the given step does not match the recording of the current progress of the task. It should be noted that the recording can be any of an image, an audio recording, a video recording, an audio-visual recording, or another suitable recording.

In some embodiments, control circuitry 404 uses a neural network to make the determination in 708. The neural network may be trained for this determination. It should be noted that several neural networks may be used, where each neural network is used for a specific type of recording (e.g., a neural network for images, a neural network for videos, a neural network for audio, or other suitable neural network). To train the neural network, a plurality of recordings that are known progress points for a given step can be run through the neural network. Those known progress points teach the neural network which combinations of features result in a match. For example, for audio recordings, features may include amplitude, rhythm, pitch, timber, duration, volume, direction, words, and other suitable features. When one or more neural networks are trained (e.g., for a specific type of recording), the control circuitry accesses the correct neural network based on the recording type and determines a plurality of features that neural network can receive as input. The control circuitry extracts one or more features from the recording showing the current progress point and executes the neural network using the one or more features extracted from the recording showing the current progress. The result of the execution is received from the neural network indicating whether there is a match for the recording to the progress point of the given step.

The system may be configured to use different algorithms for comparing different types of captured recordings (e.g., audio comparison algorithms for audio recordings, image comparison algorithms for images, video comparison algorithms for video recording, and other suitable algorithms). The control circuitry may determine a type of the captured recording and access a database that stores a plurality of recordings corresponding to the given step. The control circuitry may retrieve, from the database, a set of recordings of the type of the captured recording and compare the captured recording with recordings in the set. The control circuitry may make the determination of whether the progress point of the given step matches the current progress point based on the comparison.

To continue with FIG. 7, at 710, control circuitry 404, in response to determining that the task is at a different progress point than a progress point corresponding to the given step, outputs a recommendation for action. For example, if a device (e.g., device 102) can output video, the control circuitry can output instructions as a video. If a device can output audio, the control circuitry can output instructions as audio. If the device has both audio and video output capabilities, control circuitry 404 can output instructions in both video and audio. The control circuitry can retrieve the instructions from a database entry (e.g., stored on server 504) associated with that specific state of the task and the target state of the task.

Figure 10:
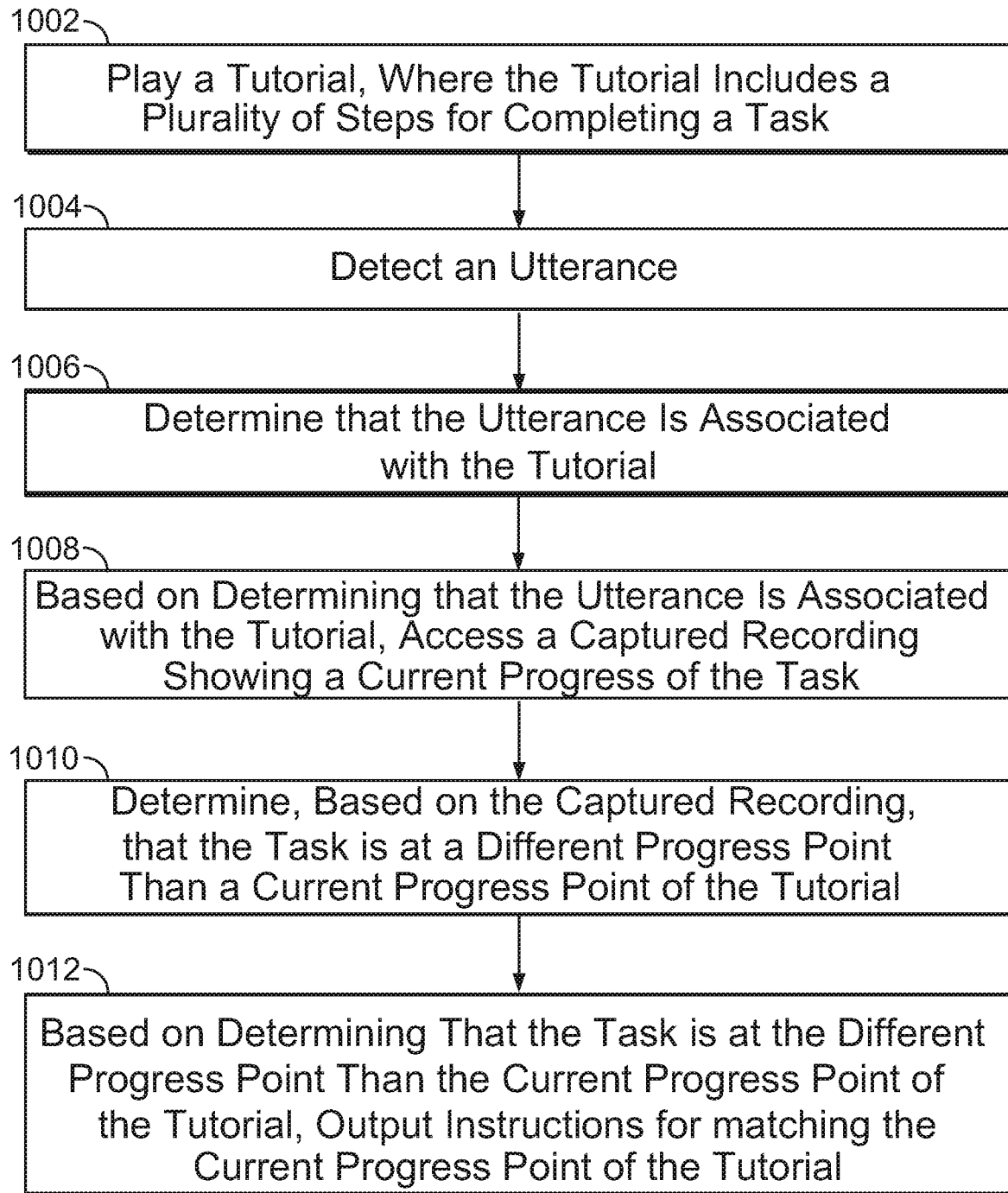
FIG. 10 is a flowchart of an illustrative process for bringing the current state of the task to the current progress point of the tutorial, in accordance with some embodiments of the disclosure.

FIG. 10 is a flowchart of an illustrative process for bringing a current state of the task to a current progress point of a digital tutorial. At 1002, control circuitry 404 plays a tutorial, where the tutorial comprises a plurality of steps for completing a task. For example, the control circuitry may play a digital tutorial on device 102. At 1004, control circuitry 404 detects an utterance. For example, device 102, on which control circuitry 404 resides, can be equipped with a microphone. Device 102 may be configured to monitor for passive input.

At 1006, control circuitry 404 determines that the utterance is associated with the tutorial. The control circuitry may make the determination by comparing the words of the utterance with keywords associated with the tutorial. For example, each tutorial may be stored with a plurality of keywords that can be used to identify the tutorial. At 1008, control circuitry 404, based on determining that the utterance is associated with the tutorial, accesses a captured recording showing a current progress of the task. The control circuitry may access a captured recording in an analogous manner as described in relation to FIG. 7 (e.g., action 706).

At 1010, control circuitry 404 determines, based on the captured recording, that the task is at a different progress point than a current progress point of the tutorial. The control circuitry may make this determination in an analogous manner as described in relation to FIG. 7 (e.g., action 708). At 1012, control circuitry 404, based on determining that the task is at the different progress point than the current progress point of the tutorial, outputs instructions for bringing the current state of the task to the current progress point of the digital tutorial. For example, if a device (e.g., device 102) can output video, the control circuitry can output instructions as a video. If a device can output audio, the control circuitry can output instructions as audio. If the device has both audio and video output capabilities, control circuitry 404 can output instructions in both video and audio. The control circuitry can retrieve the instructions from a database entry (e.g., stored on server 504) associated with that specific state of the task and the target state of the task.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for modifying a tutorial in response to an utterance, the method comprising:
   generating for display a prompt to capture video data showing a current progress of a task;
   capturing via a camera the video data showing the current progress of the task in response to acceptance of a prompt;
   storing the video data showing the current progress of the task in a memory device;
   generating for display a tutorial, wherein the tutorial comprises a plurality of steps for completing the task;
   receiving, via microphone, at control circuitry audio data comprising an utterance;
   determining that the utterance is associated with the tutorial;
   based on determining that the utterance is associated with the tutorial:
      accessing, by the control circuitry, the video data stored in the memory device, showing the current progress of the task;
      determining, based on analyzing the video data stored in the memory device, that the task is at a different progress point than a current progress point of the tutorial; and
      based on determining that the task is at the different progress point than the current progress point of the tutorial, outputting instructions for matching the current progress point of the tutorial.

2. The method of claim 1, wherein determining that the task is at the different progress point than the current progress point of the tutorial comprises:
   comparing a plurality of recordings showing the task at the current progress point of the tutorial with the video data stored in the memory device; and
   determining, based on comparing the plurality of recordings showing the task at the current progress point of the tutorial with the video data stored in the memory device, that the video data does not match any recording of the current progress of the tutorial.

3. The method of claim 1, wherein outputting the instructions for matching to the current progress point of the tutorial comprises:
   comparing the video data stored in the memory device with a plurality of recordings, wherein each of the plurality of recordings corresponds to instructions for bringing the task to a given progress point;
   retrieving, instructions corresponding to a recording of the plurality of recordings that matches the video data stored in the memory device.

4. A system for modifying a tutorial in response to an utterance, the system comprising:
   a camera;
   a microphone;
   a user input interface; and
   control circuitry configured to:
      generate for display a prompt to capture video data showing a current progress of a task;
      capture via the camera the video data showing the current progress of the task in response to acceptance of a prompt;
      store the video data showing the current progress of the task in a memory device;
      generate for display a tutorial, wherein the tutorial comprises a plurality of steps for completing the task;
      receive, via the microphone, at control circuitry audio data comprising an utterance;
      determine that the utterance is associated with the tutorial;
      based on determining that the utterance is associated with the tutorial, access, by the control circuitry, the video data stored in the memory device, showing the current progress of the task;
      determine, based on analyzing the video data stored in the memory device, that the task is at a different progress point than a current progress point of the tutorial; and
      based on determining that the task is at the different progress point than the current progress point of the tutorial, output instructions for matching the current progress point of the tutorial.

5. The system of claim 4, wherein the control circuitry is further configured to determine that the task is at the different progress point than the current progress point of the tutorial by:
   comparing a plurality of recordings showing the task at the current progress point of the tutorial with the video data stored in the memory device; and
   determining, based on comparing the plurality of recordings showing the task at the current progress point of the tutorial with the video data stored in the memory device, that the video data stored in the memory device does not match any recording of the current progress of the tutorial.

6. The system of claim 4, wherein the control circuitry is further configured to output the instructions for matching to the current progress point of the tutorial by:
   comparing the video data stored in the memory device with a plurality of recordings, wherein each of the plurality of recordings corresponds to instructions for bringing the task to a given progress point;

retrieving, instructions corresponding to a recording of the plurality of recordings that matches the video data stored in the memory device.

* * * * *